United States Patent [19]

Peterson

[11] 4,255,056
[45] Mar. 10, 1981

[54] PRE-SETTER FOR POSITIONING TOOLING ON TURRETS

[75] Inventor: Anders A. Peterson, Elmira, N.Y.

[73] Assignee: Hardinge Brothers, Inc., Elmira, N.Y.

[21] Appl. No.: 25,717

[22] Filed: Mar. 30, 1979

[51] Int. Cl.³ .................. G01B 11/00; B27G 23/00
[52] U.S. Cl. ................... 356/401; 33/185 R; 408/116
[58] Field of Search ............ 356/154, 391–393, 356/397, 399–401, 375; 350/81; 33/185 R, 286, 125 A; 408/16, 116; 82/36 A

[56] References Cited

U.S. PATENT DOCUMENTS

| | | | |
|---|---|---|---|
| 2,197,308 | 4/1940 | Kolb et al. ......................... 356/392 |
| 2,249,121 | 7/1941 | Drescher ............................. 356/392 |
| 2,738,590 | 3/1956 | Egevi ............................... 33/185 R |
| 2,990,740 | 7/1961 | Johnson ........................... 33/185 R |
| 3,039,239 | 6/1962 | Banko .................................. 356/393 |
| 3,254,560 | 7/1966 | Gottesmann . |
| 3,296,904 | 1/1967 | Bullard ................................ 408/16 |
| 3,565,530 | 2/1971 | Boissevain et al. . |
| 3,582,214 | 6/1971 | Loomis . |
| 3,614,909 | 10/1971 | Neuser ................................ 408/16 |
| 3,930,150 | 12/1975 | Marantette ....................... 250/203 R |
| 3,943,359 | 3/1976 | Matsumoto et al. .................. 250/201 |
| 4,012,148 | 3/1977 | Marantette et al. . |
| 4,054,388 | 10/1977 | Marsh et al. . |
| 4,054,824 | 10/1977 | Nishioka .............................. 318/640 |
| 4,083,272 | 4/1978 | Miller ................................ 33/185 R |

FOREIGN PATENT DOCUMENTS

2310180 3/1976 France ..................................... 82/36 A
42514 11/1965 German Democratic Rep. ..... 82/36 A Primary Examiner—John K. Corbin
Assistant Examiner—Wm. H. Punter
Attorney, Agent, or Firm—Shlesinger, Arkwright, Garvey and Dinsmore

[57] ABSTRACT

An optical presetter for precision alignment of a tool on a machine turret to be positioned on a lathe or the like. The presetter includes a base support, a light source, an adjustable carriage, and a viewer with a reference. When a tool is mounted on a turret and the turret is mounted on the carriage with the tool in the light beam; the tool can be precision aligned by moving the tool relative to the turret and noting the change of the tool image on the viewer.

23 Claims, 23 Drawing Figures

PRE-SETTER FOR POSITIONING TOOLING ON TURRETS

BACKGROUND OF THE INVENTION

This invention relates to optical presetting of tools which are mounted on a lathe turret or the like. Prior to this invention, turret lathes had to be shut down while a trained operator aligned the various tools mounted on the turret. The alignment required various alignment tools which were slow and difficult to use. This procedure was very costly as the lathe was inoperative for the duration of the alignment procedure. Also, by using a highly trained operator, additional salary costs were incurred.

The present invention has simplified and reduced the cost of aligning turret tools. Not only can the lathe be used while the tools are aligned, but also the use of a highly skilled operator is not required. Because of its simple and easy-to-use nature, this invention can be used by persons with far less training than the lathe operator. As such, the efficiency of the lathe and operator is increased and the cost of changing tooling is greatly decreased.

OBJECTS OF THE INVENTION

One object of the optical presetter is to provide an accurate machine for aligning turret tools.

Another object of the optical presetter is to provide a non-contact alignment machine for turret tools.

Still another object of the optical presetter is to provide an accurate machine for aligning turret tools which use requires a minimum amount of operator training.

Yet another object of the optical presetter is to provide a machine which enables an operator to quickly check the alignment of tools mounted on a machine turret.

An additional object of the optical presetter is to provide a machine which enables the alignment of turret tools without idling the lathe.

A further object of the optical presetter is to provide a turret tool alignment machine which can be used either standing up or sitting down.

Still a further object of the optical presetter is to provide a readout which is easily understood.

Another object of the optical presetter is to provide an optical presetter which is readily transportable and easily positioned in a convenient location with respect to the lathe machine itself.

Still another object of the optical presetter is to provide a presetter for use with a plurality of machine turret sizes.

FIGS. 1 THROUGH 5

Figure 1:
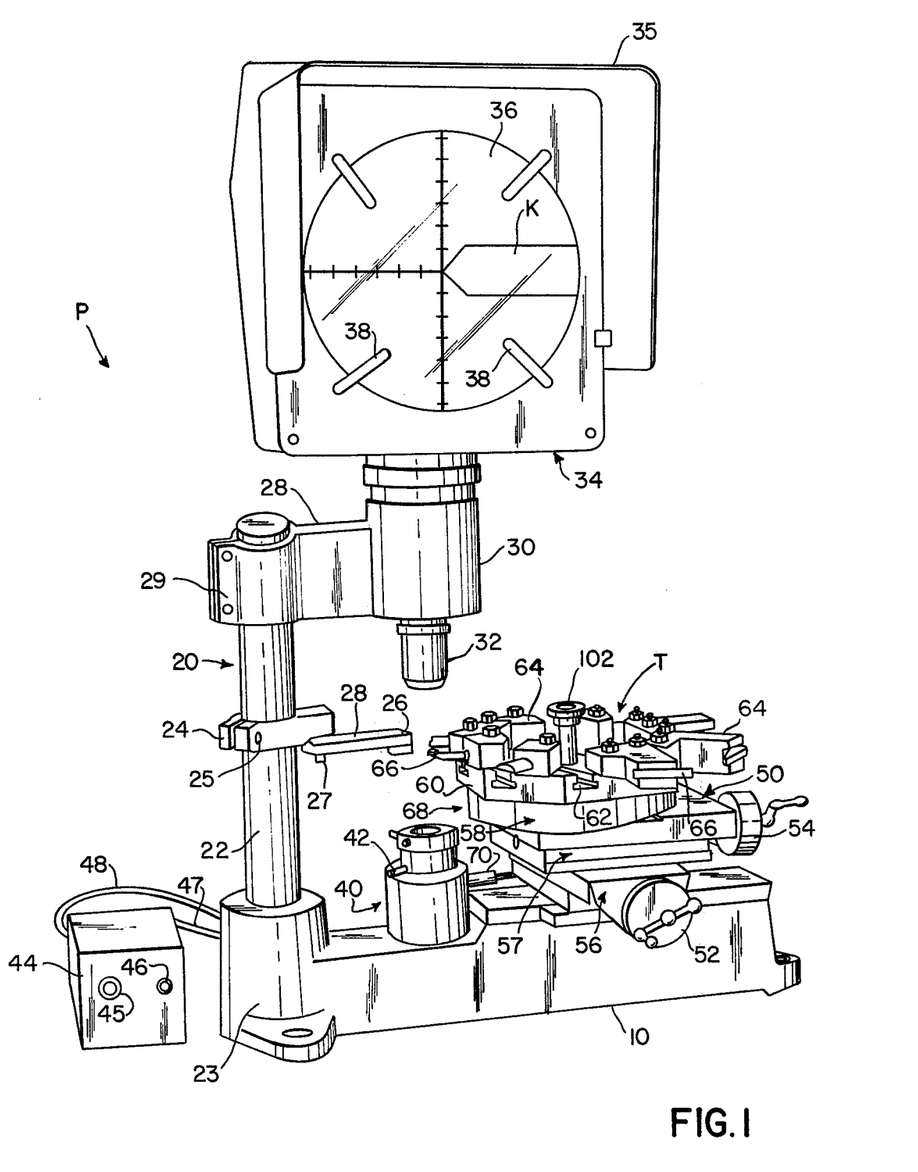
FIG. 1 is a perspective view of the optical presetter in the preferred embodiment.

In FIG. 1, which shows the optical presetter P in the preferred embodiment, the base 10 has mounted at one end thereof a viewer support 20. A light assembly 40 is shown positioned on the base 10 between the viewer support 20 and the movable carriage assembly 50 which is mounted at the opposite end of the base 10 from the viewer support 20.

The viewer support 20 includes a vertical post 22 mounted in a post holder 23 which forms an integral portion of the base 10. Mounted on the vertical post 22 is an adjustable clamp 24 which may be tightened by means of a bolt 25. A height gauge 26 is pivotally supported by the clamp 24 pivoting on a pin 27. The gauge 26 includes a mounting arm 28 provided with a supporting pin for the gauge 26 (not shown).

Mounted on the post 22 and above the gauge 26 is bracket 29 which may be swiveled or vertically raised or lowered. Bolts or other clamping means can be provided for allowing adjustment of the bracket 29 on the post 22. The bracket 29 has at one end thereof a sleeve 30. Sleeve 30 receives a lens housing 32 which in turn supports a viewer 34. The viewer 34 includes a hood 35 which surrounds a screen 36 to permit the picture on the screen to be more easily viewed since it eliminates glare from the sides and above. Associated with the viewer 34 and positioned about the screen 36 are clamps 38 for positioning paper or the like so that the outline of a projected tool can be traced thereon. A transparent or translucent matrix can be imposed on the screen 36 for gauge purposes.

It will be obvious that the lens housing 34 can be equipped with various optical systems which would permit transmission of an image K as shown in FIG. 1.

The light assembly 40 includes a light intensity adjusting mechanism 42. Shifting the mechanism 42 by rotating or otherwise will move the light intensity adjusting mechanism up or down with respect to the optical lens housing 32. Means (not shown) may also be provided for shifting of the light assembly 40 laterally with respect to the lens housing 32 for centering purposes. A control box 44 is associated with the light assembly 40 and will include some type of on or off switch mechanism 45 with an indicator light 46. Electrical cords 47 and 48 lead to the light assembly 40.

The movable carriage 50 includes vernier feed adjustments 52 and 54 for controlling the interlocking movable cross carriage assemblies 56 and 57. A turret mounting slide 58 is provided on the cross carriage assembly 57. Mounted on the turret mounting slide 58 is a turret T. The turret T includes a support plate 60 having T-slots 62 in which are positioned tool holders 64 for supporting tool 66.

Figure 2:
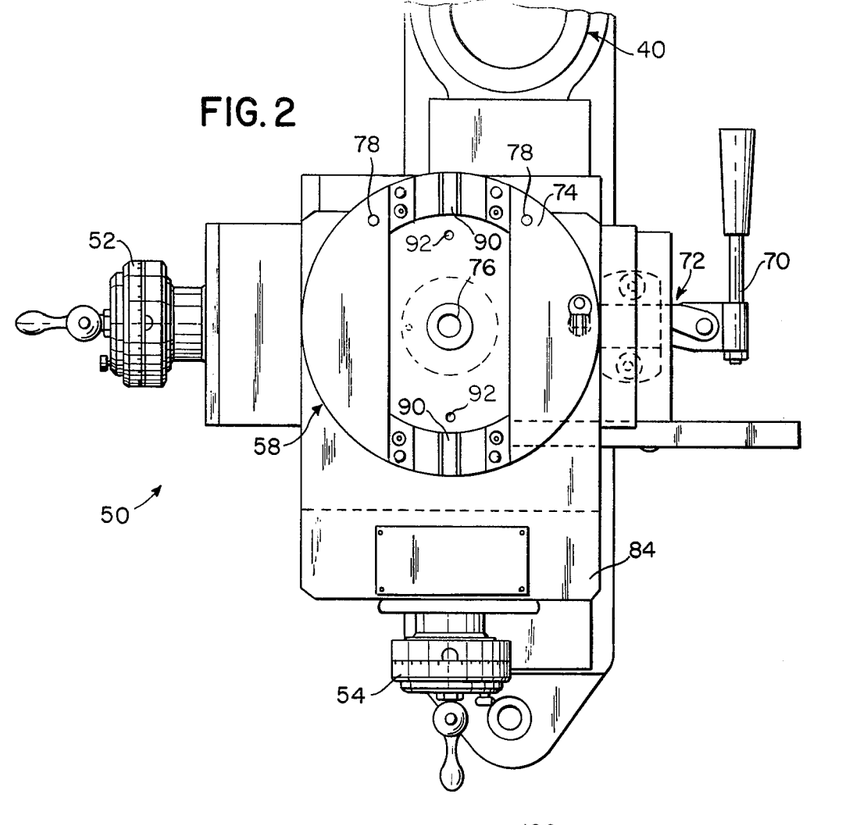
FIG. 2 is a fragmentary top plan view of the optical presetter showing the movable carriage.

The lever 70, as is shown in FIG. 2, serves to actuate the carriage locking assembly 72. Turret mounting plate 74 has a threaded bushing 76 in the center thereof and has threaded mounting holes 78.

Figure 3:
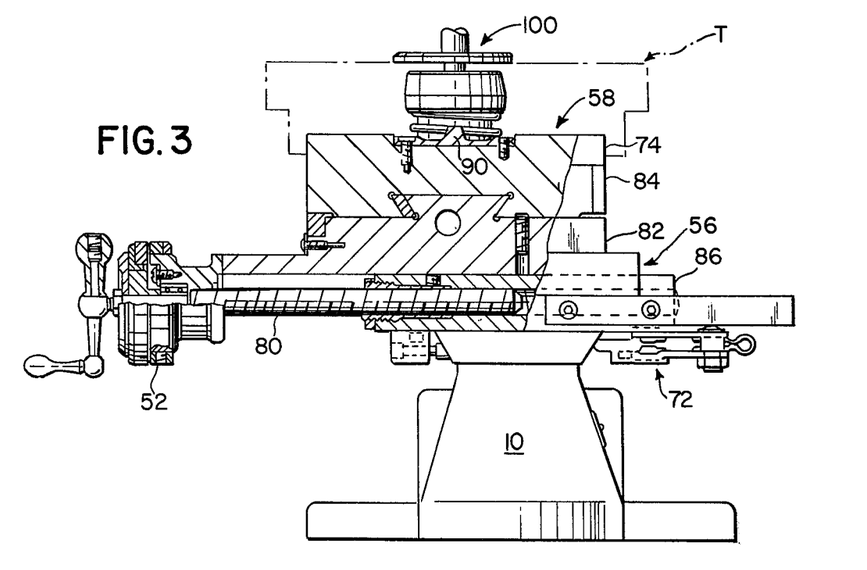
FIG. 3 is a fragmentary rear elevational view of theoptical presetter portions of which are broken away in cross section and having in broken lines, a turret mounted thereon.

On the cross carriage assembly 56, the feed screw 80, as best shown in FIG. 3, serves to adjust the position of the bottom cross carriage 82 relative to the base member 10. The carriage support 86 serves to support the bottom cross carriage 82 and includes the carriage locking assembly 72. Feed screw 88, as best shown in FIG. 4, serves to move the top cross carriage 84 relative to the bottom cross carriage 82.

Figure 5:
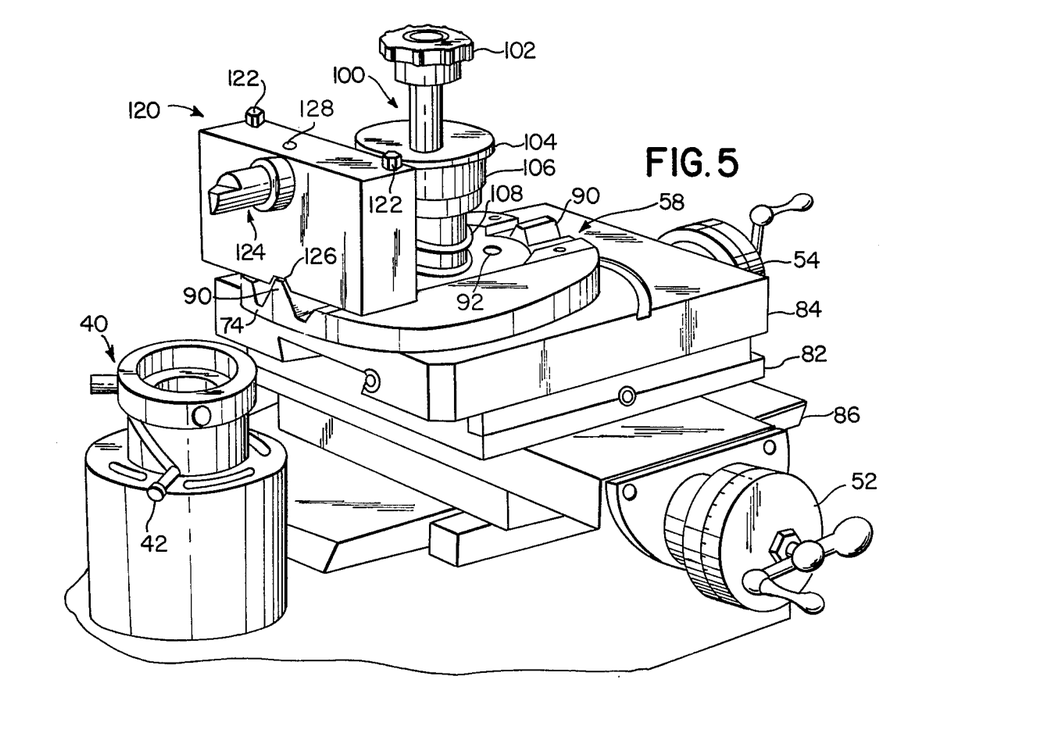
FIG. 5 is a fragmentary perspective view of the optical presetter showing the alignment gauge and turret clamp mounted on the movable carriage.

As best shown in FIG. 5, the turret mounting 58 includes keys 90, 180° apart and constructed so as to project upwardly from the top surface of the turret mounting plate 74. Alignment pinholes 92 are in axial alignment with the keys 90.

Figure 4:
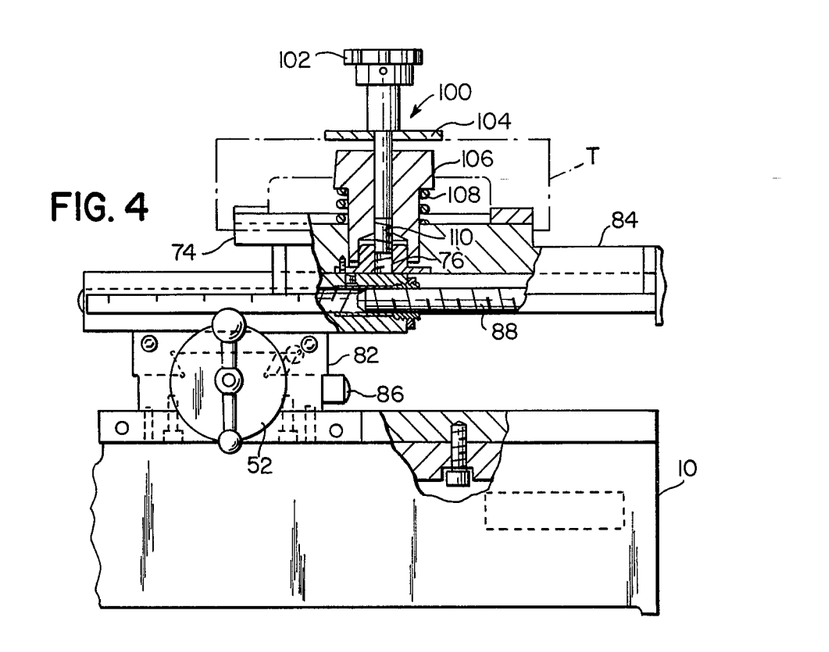
FIG. 4 is a fragmentary side view of the optical presetter with a turret mounted thereon portions of which are shown in cross section.

A screw turret clamp 100, as best shown in FIG. 4, clamps the turret T to the turret mounting plate 74. The clamp includes a knob 102, a top plate 104, a center body 106, a tensioning spring 108 and a screw shaft 110 engaging the threaded bushing 76.

Figure 6:
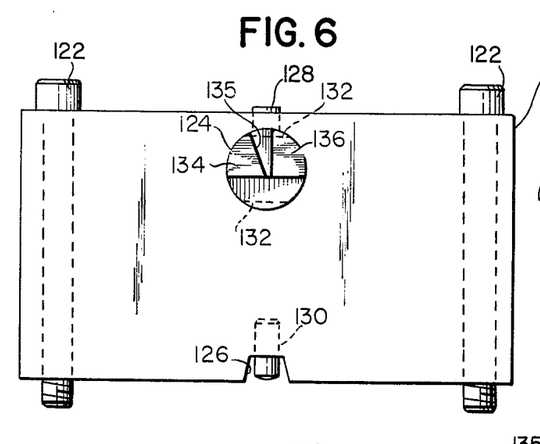
FIG. 6 is a front elevational view of the alignment gauge.
Figure 7:
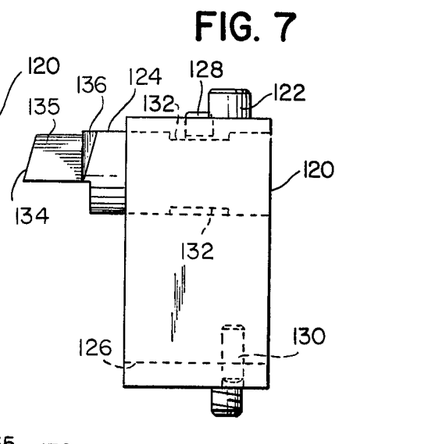
FIG. 7 is a side elevational view of the alignment gauge.

FIGS. 6 AND 7

Alignment gauge 120, as best shown in FIG. 6, mounts on the turret mounting plate 74 as shown in FIG. 5. Threaded bolts 122 pass through the gauge 120 and engage the threaded mounting holes 78 (see FIG. 2) in the turret mounting plate 74. On the front of the gauge 120 is mounted a selectable gauge pin or profile projector 124. The alignment notch 126 on the gauge 120 serves to interlock the gauge 120 on the turret mounting plate key 90 as best shown in FIG. 5. The set screw 128 as best shown in FIG. 7 serves to hold the selectable profile projector 124 in the proper orientation.

Alignment pin 130 as best shown in FIG. 6, serves to engage the alignment pinhole 92 in the turrent mounting plate 74. Flats 132 on the profile projector 124 serves to provide a engagement surface for the set screw 128.

FIGS. 8 THROUGH 15

Figures 8, 10:
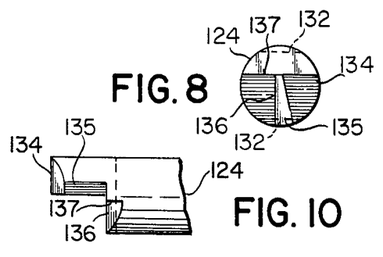
FIg. 8 is an end elevational view of the profile member showing it in the 1st position.
FIG. 10 is a fragmentary top plan view of the profile member in the first embodiment showing it in the first turret size position.
Figure 9:
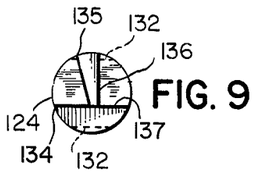
FIG. 9 is an end elevational view of the profile member showing it in the 2nd position.
Figure 11:
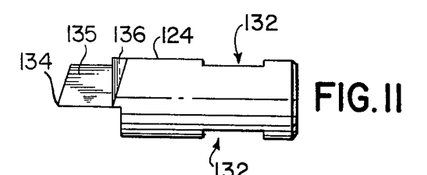
FIG. 11 is a side elevational view of the profile member in the first embodiment showing it in the first turret size position.
Figure 12:
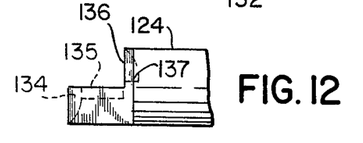
FIG. 12 is a fragmentary bottom view of the profile member in the first embodiment showing it in the first turret size position.
Figure 13:
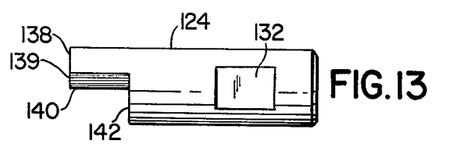
FIG. 13 is a top plan view of the profile member in the second embodiment showing it in the first turret size position.
Figure 14:
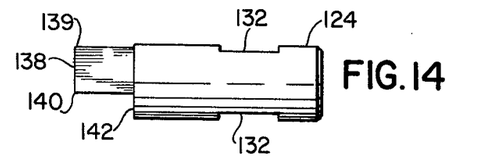
FIG. 14 is a side elevational view of the profile member in the second embodiment showing it in the first turret size position.
Figure 15:
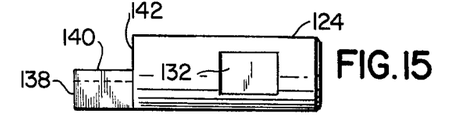
FIG. 15 is a bottom plan view of the profile member in the second embodiment showing it in the first turret size position.

A selectable profile member 124 is provided with plural sets of alignment cuts or surfaces 134 to 142 for different turret sizes. FIG. 8 shows the profile projector 124 in the first turret size position while FIG. 9 shows the profile projector 124 in the second turret size position. In the first of two configurations, as best shown in FIGS. 10 through 12, the selectable profile member 124 has alignment surfaces 134, 135, 136, and 137. The alternate configuration which is best shown in FIGS. 13 through 15, has alignment surfaces 138, 139, 140, and 142.

Figure 16:
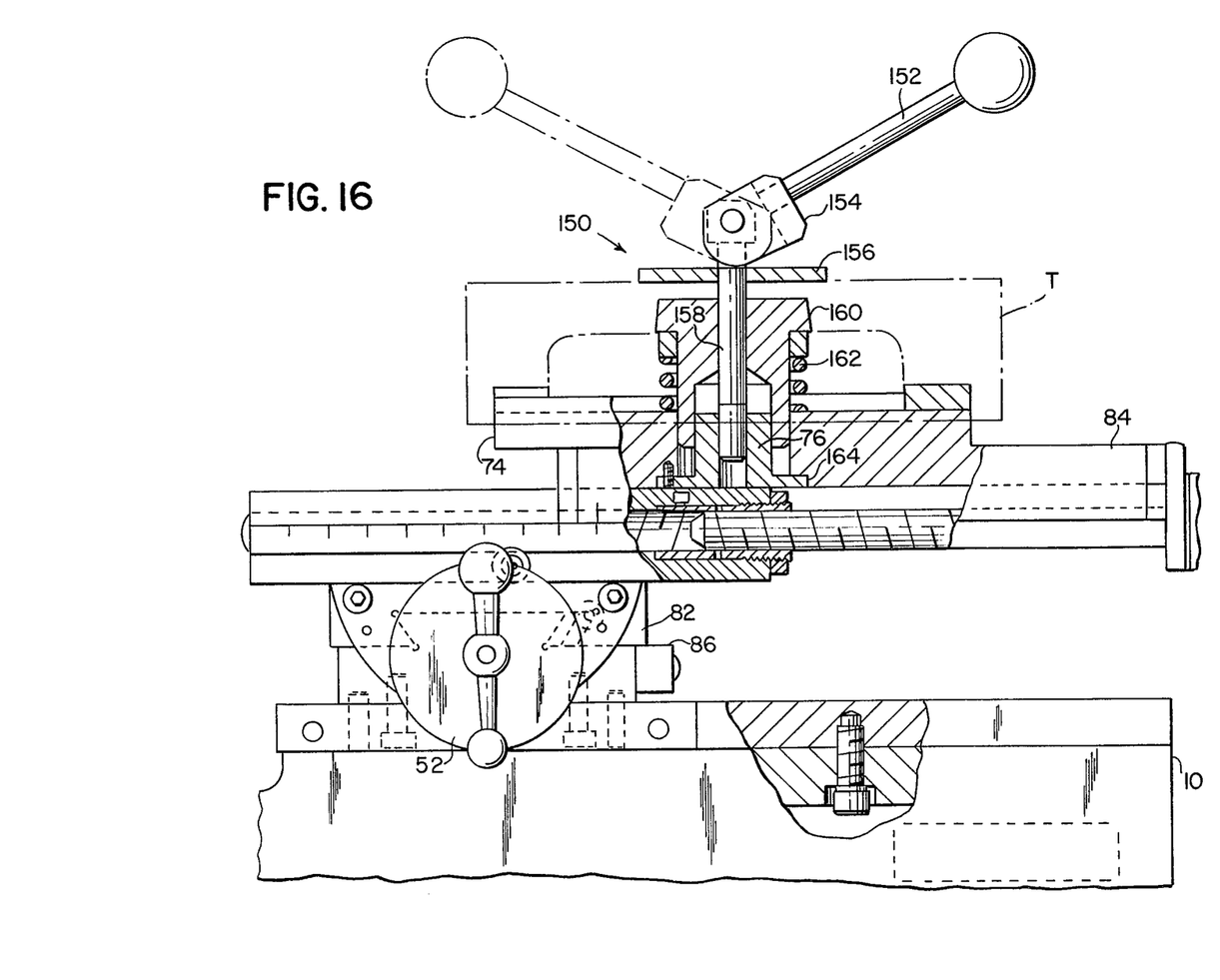
FIG. 16 is a fragmentary side view of the optical presetter with a turret shown in phantom lines and cam turret clamp mounted thereon, portions of which are shown in cross section.

FIG. 16

In FIG. 16, the cam clamp 150 is shown clamping the machine turret T to the turret mounting plate 74. The clamp includes a handle 152, a cam 154, a top plate 156, a threaded shaft 158, a center body 160 and a tensioning spring 162. The threaded shaft 158 engages the bushing 76 in the turret support plate 74.

Figure 17:
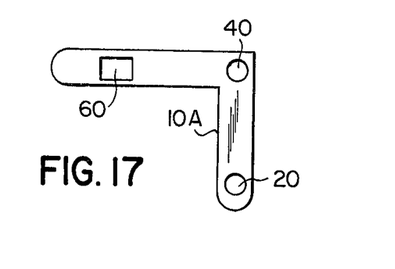
FIGS. 17 and 18 are schematic diagrams of alternate base configurations.
Figure 18:
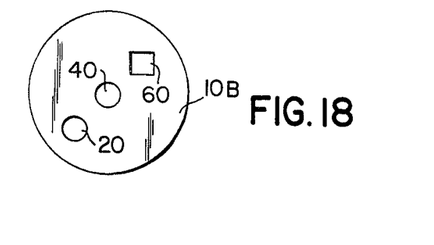

FIGS. 17 and 18

Alternate configurations for the base member 10 are shown in FIGS. 17 and 18. An L-shaped base 10A and a circular shaped base 10B are shown schematically. Both are depicted positioning, generally, a viewer support system 20, a light assembly 40, and a movable carriage 60.

Figure 19:
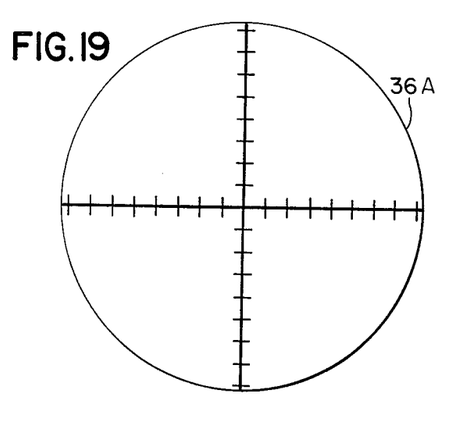
FIGS. 19 and 20 are alternate reference screens for the viewer.
Figure 20:
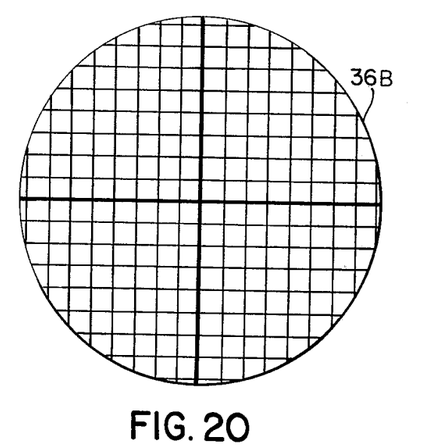

FIGS. 19 AND 20

Two alternate viewer screen arrangements are shown in 36A and 36B. 36A shows a cross hair reference line wherein each line has increment lines to aid in measurement. The screen 36B is depicted with heavy center cross hair arrangement with multiple, evenly spaced, intersecting reference lines.

Figure 21:
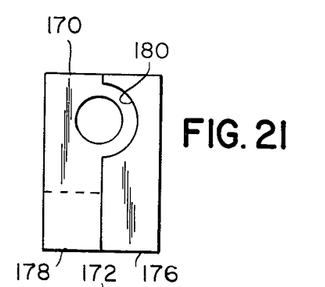
FIG. 21 is a top plan view of the turret alignment gauge.
Figure 22:
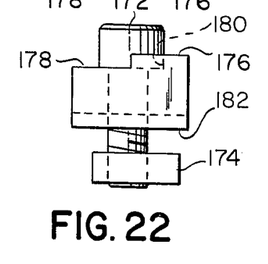
FIG. 22 is a front elevational view of the turret alignment gauge with the mounting means attached.
Figure 23:
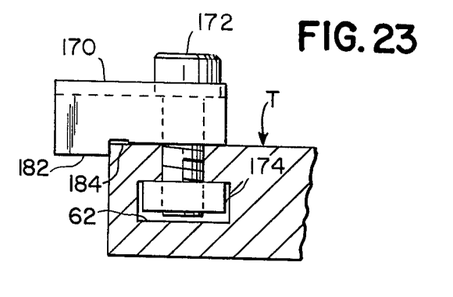
FIG. 23 is a side elevational view of the turret alignment gauge with the mounting means attached.

FIGS. 21 THROUGH 23

The turret alignment gauge 170 has a screw 172 which passes through the gauge 170 and engages a clamp 174. Gauge 170 also has alignment surfaces 176 and 178. The cutout 180 as shown by FIG. 21, enables proper seating of the screw 172. As shown in FIG. 23, the gauge 170 is provided with a surface 182 which includes a relief 184.

OPERATION

The operation of the invention is as follows: Alignment gauge 120 is mounted on the movable carriage 50 as best shown in FIG. 5. The vernier adjustor 52 moves the carriage axially.

By adjusting the vernier adjustors 52 and 54, the profile from the selectable profile projector 124 is centered on the viewer screen 36.

The selectable profile member 124 in this embodiment has two sets of reference cuts which are used to center the projection from the profile member with respect to the reference lines on the screen 36. With the profile projector in the position as depicted by FIG. 10, the leading edge 134 is used to control the axial alignment of the carriage 50. Reference edge 135 is used to control the lateral alignment of the carriage 50. The correct focus adjustment for the lens assembly 32 is achieved by noting the image projected from the profile 134 and adjusting the lens assembly 32 until the reference edge 135 on profile member 124 is in sharp focus. It should be noted that the references on the screen 36 can take on many forms such as those in FIGS. 19 and 20.

After the profile from the projector 124 is centered on the screen, the alignment gauge is removed. The machine turret 60 in FIG. 1 is mounted on the carriage 50. Turret clamps 100 or 150 are used to secure the turret in place. The tool holders 64 with tools 66 are mounted on the turret, with the tool to be adjusted projecting into the light beam from the light assembly 40. With the tool in the light beam, the profile from the tool will be projected onto the screen 36 of the viewer 32.

By noting the position of the image from the tool on the screen 36, as shown in FIG. 1, the tool and holder can now be shifted on the machine turret to produce the correct axial and lateral position adjustment to produce the required cut on the lathe machine. By comparing the image from the height gauge 26 with the tool 66 being adjusted, the correct heighth of the tool 66 relative to the turrent T can be precisely adjusted. If the tool 66 is not at the correct height setting, the image of the tool 66 on the screen 36 will not be sharp until the correct height adjustment of the tool 66 is achieved.

Should it be necessary to recheck the proper alignment of the turret T, the turret alignment gauge 170 as shown in FIGS. 21, 22, and 23 can be mounted in the T-slot of the turret T as shown in FIG. 1. This will enable the operator to determine whether or not the viewer 34 has the lens assembly 32 adjusted to produce the required sharp image of the tool 66 at the correct tool height.

As in the assembly shown, two main types of turrets can be used. The selectable profile member 124 is manufactured to compensate for the differences in size of turrets. By rotating the profile member 124 180°, different calibration marks on the profile member are brought into effect. Referring now to FIGS. 10 through 12, as mentioned earlier, these figures show the various cuts required to align a first size turret. FIG. 10 which is a top view of the profile member has edges 134 and 135. The edge of 134 serves to correctly position the carriage axially and also to adjust the focus of the viewer lens assembly for the correct tool heighth of a tool mounted on a first size turret. The edge 135 serves as a lateral reference for the profile member. By noting when a projection of these edges appear on the viewer screen 36 of FIG. 1, the carriage can be aligned so that the edges are centered. By doing so the carriage is precisely aligned relative to the references on the viewer.

Referring now to FIGS. 13 through 15, these figures represent an alternate construction of the profile member. FIG. 13 the profile member has edges 140 and 138. Edge 140 serves as the lateral adjustment edge and also as the focus references for the viewer so that the viewer will have a sharp image of the projection of a tool at the required height for a first size turret. Edge 138 serves as the axial adjustment reference for the profile projector. As before, by noting the location of the various edges of this projector the carriage can be positioned so that these edges are in the centered position on the viewer screen 36 and by doing so the carriage itself is precisely aligned relative to the reference on the screen 36.

When use of a second size turret is required, the profile projector 124 is rotated 180° so as to bring the opposite surface on the projector 124 into the proper position. FIG. 8 shows an end view of the profile projector 124 in the second turret size position. It should be noted that the edge 134 is now inverted so the top of the projection extends further than the bottom projection. In FIG. 9 the profile projector 124 is shown in the first turret size position and should be noted that edge 134 is now positioned such as the bottom extends further than the top.

When the turret is already mounted on the carriage and the operator is required to recheck alignment of the turret, the gauge in FIGS. 21, 22, and 23 is used as previously mentioned. As shown in FIG. 22, edges 176 and 178 are stepped at different heights. When a first size turret is to be checked, the edge 178 is used to check the focus of the viewer assembly. When a second size turret is used the edge 176 is used as a reference for the focus of the viewer assembly. The common front edge of references 176 and 178 are used to check the axial alignment of the turret.

In order to secure the turret to the movable carriage, the use of turret clamps such as 100 or 150 are used. Referring now to FIGS. 4 and 5 the operation of the screw clamp 100 is as follows: The knob 102, top plate 104 and screw shaft 110 are removed from the center body 106. The center body 106 and spring 108 are mounted on the turret mounting plate 74. The turret T is mounted over the center body 106, then the screw shaft is passed through the top plate 104 through the turret T and center body 106 and screwed into the threaded hole 76. As the screw is screwed further into the hole 76, the top plate 104 forces the turret T and the center body 106 down until the turret and turret mounting plate meet. The meeting between the turret T and the turret mounting plate 74 and the biasing from the spring 108 serves to prevent the turret T from shifting position.

Referring now to FIG. 16, the operation of the cam turret clamp is as follows: The operation of the cam clamp 150 is similar to the screw clamp 100 with the exception that instead of screwing down the bolt 110 in the screw clamp, in the cam clamp the handle 152 is pulled to the right which moves cam 154 which in turn pushes down the top plate 156 until the turret and the turret mounting plate engage. As in the screw clamp, the engagement between the turret T and the turret mounting plate 74 and the biasing from spring 162 prevents the turret from shifting position.

Referring now to FIG. 1, it should be noted that the light intensity adjustor 42 on the light assembly 40 allows for fine adjustment of the intensity in order to obtain the required contrast between the image projection from the tool and the blank sections of the viewer screen 36.

While this invention has been described as having a preferred design, it will be understood that it is capable of further modification. This application, is therefore, intended to cover any variation, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. An optical presetter for precision alignment of a tool on a machine turret for subsequent positioning of said machine turret on a lathe or the like including:
   (a) a base having a front portion and a rear portion;

(b) said rear portion simulating a lathe and including a movable carriage mounted thereon;
(c) said front portion consisting of an optical presetting system;
(d) a light source on said base for projecting a light beam;
(e) a viewer support mounted on said base and having an image viewer;
(f) said image viewer having means for receiving said light beam and projecting said beam onto said image viewer;
(g) said image viewer having a reference;
(h) means for positioning said carriage relative to said reference; and,
(i) whereby when said carriage is positioned relative to said reference and said turret is positioned on said carriage with said tool in said light beam, the tool image is projected on said viewer so that the tool can be precisely adjusted relative to said reference by shifting the tool relative to said turret thus shifting the tool image relative to said reference.

2. An optical presetter as in claim 1 and wherein:
(a) said light source has a light beam with adjustable intensity.

3. An optical presetter as in claim 1 wherein:
(a) said viewer support includes a vertical post affixed at one end to said base;
(b) a horizontal mounting arm mounted on said vertical post; and,
(c) an image viewer supported on said horizontal mounting arm.

4. An optical presetter as in claim 3 and wherein:
(a) said vertical post includes an adjustable height gauge slidable thereon.

5. An optical presetter as in claim 1 wherein:
(a) said image viewer includes an image screen having a plane perpendicular to the plane of said base member.

6. An optical presetter as in claim 1 and wherein:
(a) said reference includes a plurality of vertical reference lines; and,
(b) a plurality of horizontal reference lines perpendicular to said vertical reference lines.

7. An optical presetter as in claim 1 wherein:
(a) said reference includes a vertical reference line; and,
(b) a horizontal reference line perpendicular to said vertical reference line.

8. An optical presetter as in claim 7 wherein:
(a) said reference lines include a plurality of increment lines which subdivide said reference lines.

9. An optical presetter as in claim 1 wherein:
(a) said movable carriage includes a lateral adjusting means; and,
(b) an axial adjusting means.

10. An optical presetter as in claim 9 wherein:
(a) said lateral and said axial adjusting means are vernier controlled.

11. An optical presetter as in claim 1 wherein:
(a) said movable carriage is lockable to prevent movement.

12. An optical presetter as set forth in claim 1 and wherein:

(a) said movable carriage includes a turret mounting means.

13. An optical presetter as in claim 12 wherein:
(a) said mounting means includes a clamp means.

14. An optical presetter as set forth in claim 13 wherein:
(a) said clamp means includes a cam operated clamp.

15. An optical presetter as set forth in claim 13 wherein:
(a) said clamp means includes a screw clamp.

16. An optical presetter as in claim 12 wherein:
(a) said mounting means includes means for securing a gauge thereon.

17. An optical presetter as in claim 16 wherein:
(a) said means for securing includes a key projecting vertically from the top of said movable carriage; and,
(b) at least one threaded hole in the top of said movable carriage.

18. An optical presetter as in claim 1 wherein:
(a) said light source, viewer support, and said movable carriage are aligned in an L-shape on said base.

19. An optical presetter as in claim 1 wherein:
(a) said light source, movable carriage, and said viewer are mounted in line with each other.

20. An optical presetter for precision alignment of a tool on a machine turret for subsequent positioning of said machine turret on a lathe or the like including:
(a) a base having a front portion and a rear portion;
(b) said rear portion simulating a lathe and including a movable carriage mounted thereon;
(c) said front portion consisting of an optical presetting system;
(d) a light source on said base for projecting a light beam;
(e) a viewer support mounted on said base member and having an image viewer;
(f) said image viewer having means for receiving said light beam and projecting said beam onto said image viewer;
(g) said image viewer having a reference;
(h) means for positioning said carriage relative to said reference;
(i) said positioning means includes an alignment gauge;
(j) whereby when said carriage is positioned relative to said reference and said turret is positioned on the movable carriage with a tool in said light beam, the tool image is projected onto said viewer so that the tool can be precisely adjusted relative to said turret thus shifting the tool image relative to said reference.

21. The turret alignment gauge in claim 20 wherein:
(a) said alignment gauge has a plurality of reference points.

22. The turret alignment gauge in claim 21 wherein:
(a) said reference points include axial and transverse alignment references.

23. The alignment gauge in claim 20 wherein:
(a) said turret has at least one integral mounting slot; and,
(b) said alignment gauge includes means for mounting in said mounting slot.

* * * * *